E. T. BEATTY.
QUICK DETACHABLE COUPLING FOR DRILL PIPES.
APPLICATION FILED SEPT. 8, 1915.

1,218,359.  
Patented Mar. 6, 1917.

Witnesses  
Inventor  
EDWARD T. BEATTY.  
By  
Attorney

UNITED STATES PATENT OFFICE.

EDWARD TROY BEATTY, OF BIRMINGHAM, ALABAMA, ASSIGNOR OF ONE-HALF TO LEE WILSON, OF SHREVEPORT, LOUISIANA.

QUICK-DETACHABLE COUPLING FOR DRILL-PIPES.

1,218,359.  Specification of Letters Patent.  Patented Mar. 6, 1917.

Application filed September 8, 1915. Serial No. 49,614.

*To all whom it may concern:*

Be it known that I, EDWARD TROY BEATTY, a citizen of the United States of America, residing at Birmingham, in the county of Jefferson and State of Alabama, have invented certain new and useful Improvements in Quick-Detachable Couplings for Drill-Pipes, of which the following is a specification.

My invention relates to a coupling for drill pipes having for its object to provide a joint which can be quickly parted to facilitate the disjointing of the pipe or repairing the drill tool.

The principal object of my invention is to provide a coupling having a special joint in it whereby the screwing and unscrewing of the main pipe threaded joints to the coupling is avoided in disjointing the pipe, and by this means I protect the pipe threads from the wear that would result from the frequent screwing and unscrewing of their threaded ends from the coupling.

A further object of my invention relates to the manner in which I protect the threads of the joint between the sleeve sections by providing inside and outside butt joints between the meeting end of the sections at each end of the threads, which joints effectively prevent water and foreign matter that exists both inside and outside of the pipe working into the joint and making it difficult to unscrew it. I have found that in the use of my improved type of joint the grease in the threads is maintained during the ordinary periods of use and that I am therefore enabled with practically no trouble to break the coupling joints when taking out the drill pipe.

A further object of my invention is to provide a threaded joint in the coupling which permits the coupling sections to be quickly parted, the threads being designed as a very coarse pitch square thread which will greatly increase the strength of the joint and the speed of coupling or uncoupling the sections.

A further object of my invention is to provide a sectional coupling in which the water passage therethrough will be of a maximum size without impairing the strength of the coupling and which offers a minimum resistance therefore to the flow of water therethrough. A further advantage of this large hole or passageway through the coupling is that it makes it very much easier to fish out the broken sections in that it affords a large opening for the fishing tool.

My invention further embodies the novel details of construction and arrangements of parts, which in their preferred embodiment only are illustrated in the accompanying drawings, in which:—

Similar reference numerals refer to similar parts throughout the drawings.

Figure 1:
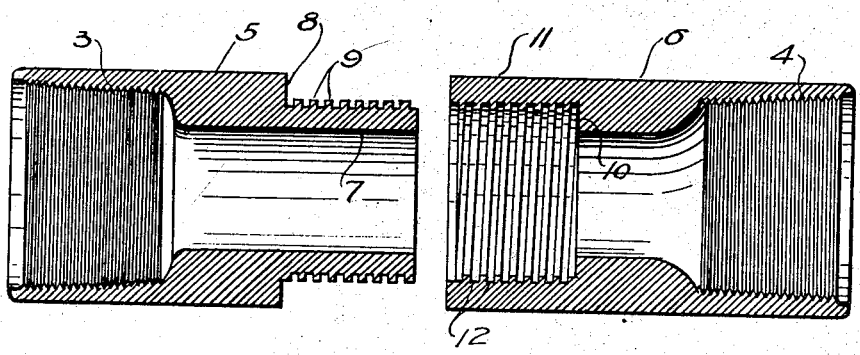
Figure 1 is a longitudinal sectional view showing the two sections of the coupling parted.
Figure 2:
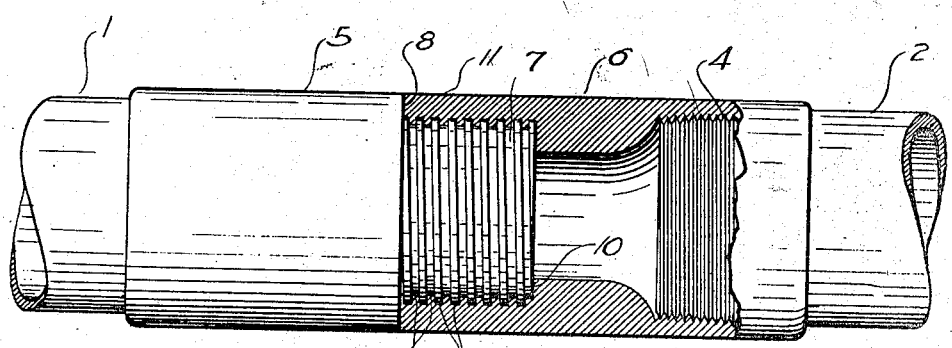
Fig. 2 illustrates the coupling sections in longitudinal cross section assembled and coupled to drill pipe sections.

I have illustrated my improved coupling as connected to two sections 1 and 2 of a drill pipe which may be of any ordinary standard construction, carrying at its lower end the drill tool (not shown) and being adapted to be reciprocated by any suitable drilling mechanism. The adjacent ends of the pipe sections 1 and 2 are tapered and threaded in the customary manner and in my coupling I provide two taper threaded sockets 3 and 4 into which the taper ends of the pipe sections are firmly screwed to make their joint to the coupling. The coupling itself is divided transversely into two sections 5 and 6, which sections are similar except in respect of the arrangement of their meeting ends to provide male and female threaded members for the joint. Section 5 is provided with a reduced end 7, leaving an outside annular butt shoulder 8 at its inner end and provided circumferentially with a coarse square thread 9 which will preferably have as coarse a pitch as two to the inch. The outer coupling section 6 is counterbored to form an offset inside annular butt shoulder 10 and to leave a sleeve 11 of reduced thickness in which is provided a coarse thread 12, corresponding to the thread 9 on the other coupling section. The shoulders 8 and 10 are so spaced with reference to the ends of their respective sections that each will at the same time engage the end of the opposite coupling section as the latter are screwed together. I thus provide a wide butt joint at each end of the threaded joint which will safely and effectively exclude therefrom both from the inside and the outside water, dirt and other matter and preserve the threads well lubricated for quick and easy detachment.

In use, having screwed each coupling section to its respective pipe end, the sections are themselves screwed together, thus completing the pipe joint. When it becomes necessary to break this joint, it is done, without disturbing the joints between the pipes and the coupling section, by unscrewing the joint between the coupling sections and this joint having threads with an extreme pitch can be almost instantaneously disconnected.

Having thus described my invention, what I claim as new and desire to secure by Letters Patent, is:—

The combination with adjacent tubular sections of well casing threaded at their ends, of a quick detachable coupling for the casing comprising two tubular coupling sections formed with quick detachable connecting non-tapering threaded portions having heavy square threads of coarse pitch, square shoulders offset at each end of said threaded portions and spaced to provide wide butt joints at each end of the joint in the assembled coupling and a threaded end on each coupling section having fine pitch threads adapted to couple to the casing sections, said non-tapering threaded portions of the coupling having therethrough a straight bore which does not substantially throttle the well casing.

In testimony whereof I affix my signature.

EDWARD TROY BEATTY.

Witness:
NOMIE WELSH.